(12) United States Patent
Barton et al.

(10) Patent No.: US 10,359,858 B2
(45) Date of Patent: Jul. 23, 2019

(54) SYSTEMS AND METHODS FOR SIMULATING SOUNDS OF A VIRTUAL OBJECT USING PROCEDURAL AUDIO

(71) Applicant: DISNEY ENTERPRISES, INC., Burbank, CA (US)

(72) Inventors: Mark R. Barton, Burbank, CA (US); Cameron J. Kaye, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 171 days.

(21) Appl. No.: 15/259,019

(22) Filed: Sep. 7, 2016

(65) Prior Publication Data

US 2018/0068487 A1    Mar. 8, 2018

(51) Int. Cl.
| | |
|---|---|
| *H04R 5/02* | (2006.01) |
| *G06F 3/01* | (2006.01) |
| *H04S 7/00* | (2006.01) |
| *G06F 3/0481* | (2013.01) |
| *G06F 3/0346* | (2013.01) |

(Continued)

(52) U.S. Cl.
CPC ............. *G06F 3/017* (2013.01); *G06F 3/011* (2013.01); *G06F 3/0346* (2013.01); *G06F 3/03545* (2013.01); *G06F 3/04815* (2013.01); *H04S 7/307* (2013.01); *H04R 1/028* (2013.01);

(Continued)

(58) Field of Classification Search
CPC ... G02B 27/0172; G02B 27/306; G06F 3/011; G06F 3/012; G06F 3/165; G06F 3/167; G06F 3/017; G06F 3/03; G06F 3/0304; G06F 3/0312; G06F 3/0317; G06F 3/0321; G06F 3/0325; G06F 3/033; G06F 3/0338; G06F 3/0346; G06F 3/0354; G06F 3/03545; G06F 3/03546; G06F 3/03547; G06F 3/03549; G06F 3/0362; G06F 3/0308; H04S 1/00; H04S 1/002; H04S 1/005; H04S 3/00; H04S 7/303; H04S 7/304; H04S 2420/01; H04S 2420/11; H04S 2400/01; H04S 2400/11; H04S 2400/15; H04R 3/00; H04R 3/005; H04R 3/12; H04R 3/033; H04R 27/00; H04R 5/00; H04R 5/02; H04R 2217/03; H04R 2420/01; H04R 2420/07; H04R 2460/07; G08B 23/00; A63H 5/00; A63H 5/04; A63H 1/28; A63H 3/28; A63H 17/32; A63H 19/14; A63H 2200/00; A10K 15/00; A10K 15/025; G05B 2219/00;

(Continued)

(56) References Cited

U.S. PATENT DOCUMENTS

| | | | | |
|---|---|---|---|---|
| 6,297,807 | B1 * | 10/2001 | Eisbach | ............... G06F 3/0338 |
| | | | | 345/156 |
| 7,445,550 | B2 * | 11/2008 | Barney | ............... A63F 13/428 |
| | | | | 463/37 |

(Continued)

*Primary Examiner* — Leshui Zhang
(74) *Attorney, Agent, or Firm* — Esplin & Associates, PC

(57) ABSTRACT

This disclosure relates to simulating sounds of a virtual object using procedural audio. A position and/or an orientation for the virtual object may be determined. Changes in the position and/or the orientation for the virtual object may be determined and used to determine the procedural audio. The procedural audio may include a first modulation of a first sound, a second modulation of a second sound, and/or other sounds. A speaker may be operated to provide the procedural audio to simulate the sounds of the virtual object.

20 Claims, 8 Drawing Sheets

(51) Int. Cl.
*G06F 3/0354* (2013.01)
*H04R 1/02* (2006.01)
*H04R 3/04* (2006.01)

(52) U.S. Cl.
CPC .................. *H04R 3/04* (2013.01); *H04R 5/02* (2013.01); *H04S 2400/11* (2013.01)

(58) Field of Classification Search
CPC ..... G06T 19/00; G06T 19/003; G06T 19/006; G06T 19/20; G06T 2200/32; G11B 19/025
USPC ..... 381/1, 310, 306, 303, 304, 305, 89, 332, 381/333, 309, 17, 18, 19, 26, 58, 91, 92, 381/122, 182, 326, 370, 374, 74, 63, 61, 381/77, 79; 700/94; 345/8, 633, 173; 704/233, 235, 270, 272, 273, 275; 715/716, 727, 848; 463/49, 56, 47.6, 38; 340/573.1, 407.2, 539.1, 7.58; 434/4, 10, 434/81, 90, 91, 92, 102, 230; 472/64, 65; 446/175, 188, 192, 203, 207, 213, 215, 446/216, 242, 251, 254, 258, 266, 270, 446/297, 397, 398, 401, 402, 404, 405, 446/406

See application file for complete search history.

(56) References Cited

U.S. PATENT DOCUMENTS

| | | | | |
|---|---|---|---|---|
| 7,850,527 | B2* | 12/2010 | Barney | A63F 13/86 463/37 |
| 7,876,903 | B2* | 1/2011 | Sauk | G01C 21/165 381/17 |
| 9,678,506 | B2* | 6/2017 | Bachrach | G05D 1/0016 |
| 2004/0204240 | A1* | 10/2004 | Barney | A63H 30/04 463/36 |
| 2008/0281597 | A1* | 11/2008 | Suzuki | A63F 13/04 704/258 |
| 2010/0091185 | A1* | 4/2010 | Ueno | G09G 3/3611 348/452 |
| 2011/0242134 | A1* | 10/2011 | Miller | G06T 19/006 345/633 |
| 2012/0223822 | A1* | 9/2012 | Ferringo | G01S 1/725 340/384.7 |
| 2012/0302349 | A1* | 11/2012 | Marks | G06F 3/017 463/38 |
| 2013/0182858 | A1* | 7/2013 | You | G06F 3/167 381/58 |
| 2013/0324248 | A1* | 12/2013 | Wilson | G06F 3/017 463/31 |
| 2016/0310838 | A1* | 10/2016 | Poisner | H04L 67/10 |

* cited by examiner

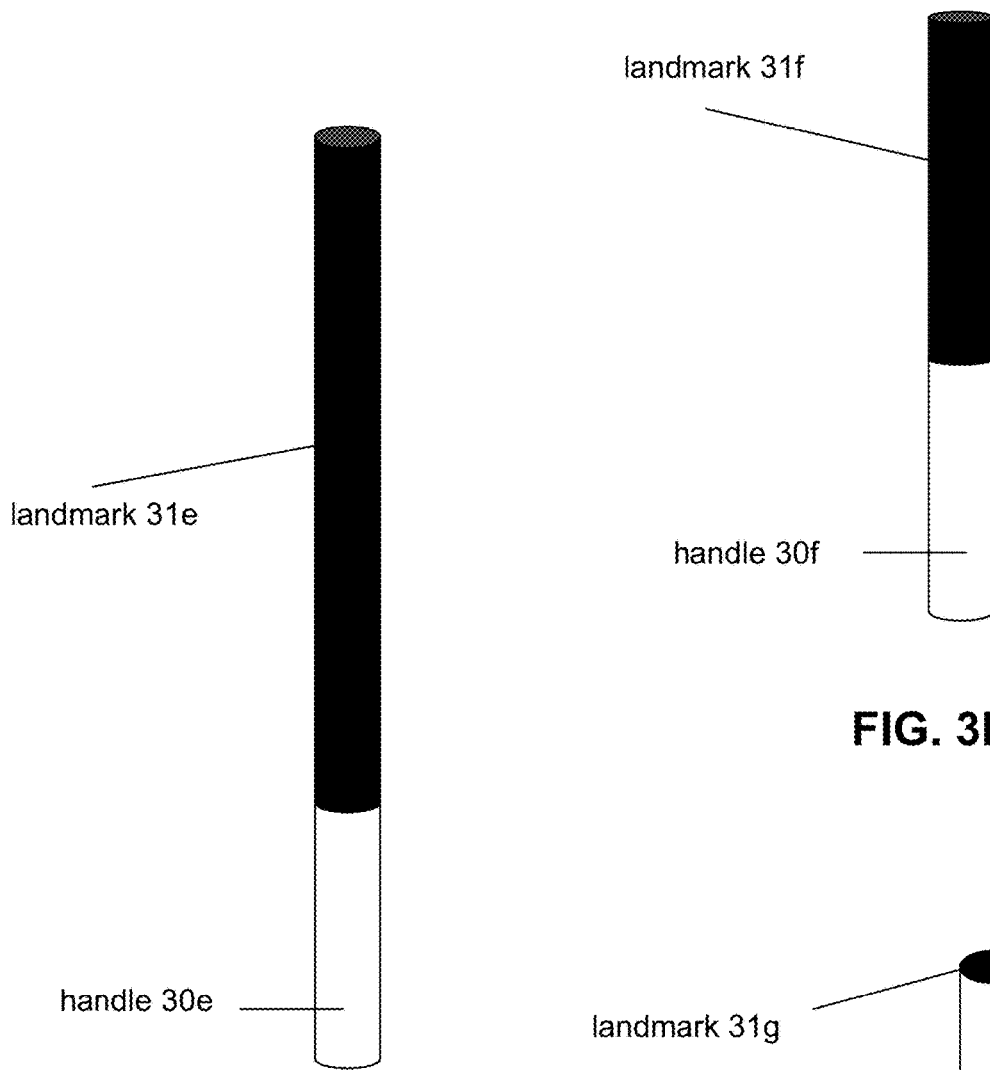
FIG. 3E
FIG. 3F
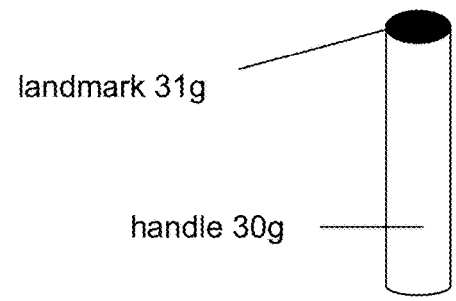
FIG. 3G

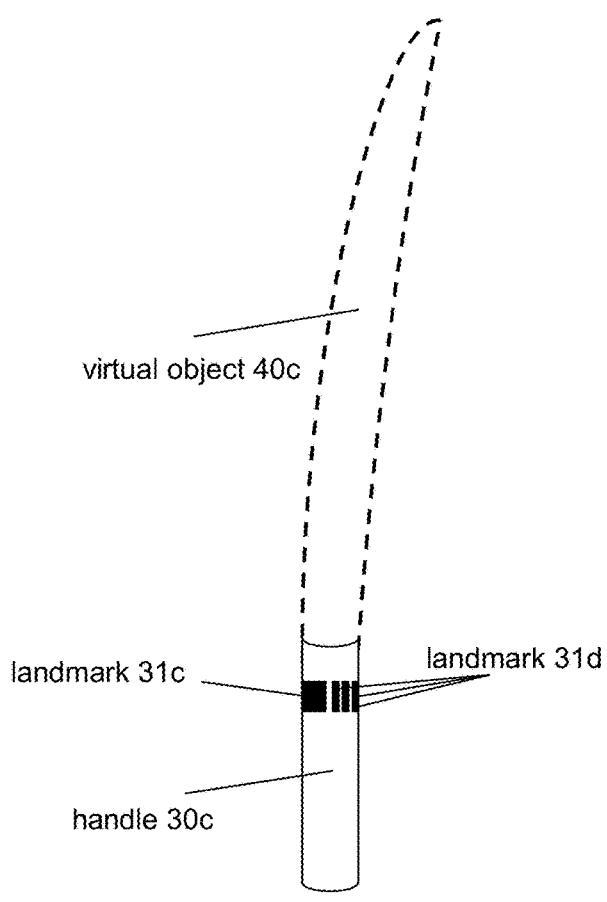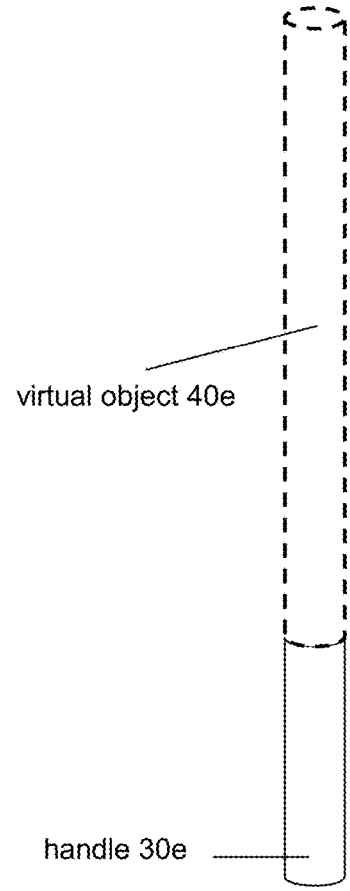
FIG. 4C
FIG. 4D

SYSTEMS AND METHODS FOR SIMULATING SOUNDS OF A VIRTUAL OBJECT USING PROCEDURAL AUDIO

FIELD

This disclosure relates to systems and methods for simulating sounds of a virtual object using procedural audio.

BACKGROUND

Toy weapons that produce pre-generated sounds in response to movements of the toy weapons are known. Such toy weapons do not use procedural audio to modify sounds to match the particular movements of the toy weapons.

SUMMARY

This disclosure relates to simulating sounds of a virtual object using procedural audio. A position and/or an orientation for the virtual object may be determined. Changes in the position and/or the orientation for the virtual object may be determined. Changes in the position and/or the orientation for the virtual object may be used to determine the procedural audio. The procedural audio may include a first modulation of a first sound, a second modulation of a second sound, and/or other sounds. A speaker may be operated to provide the procedural audio to simulate the sounds of the virtual object.

A system configured to simulate sounds of a virtual object using procedural audio may include one or more of a storage medium, a handle, a motion and orientation sensor, a speaker, one or more physical processors, and/or other components. In some implementations, the system may include a display and an image sensor. In some implementations, the image sensor and/or the one or more processors may be carried on the display. The field of view of the image sensor may be a function of the position and/or the orientation of the display, and/or other information.

The storage medium may store a repository of sounds and/or other information. The repository of sounds may include a first sound, a second sound, and/or other sounds. In some implementations, the first sound may include a base tone and/or other sounds, and the second sound may include an overtone and/or other sounds.

The display may be configured to display an overlay image and/or other information. The display may include one or more devices that may present information visually. In some implementations, the display may include one or more screens of one or more display devices. In some implementations, the display may include one or more display devices. In some implementations, the display may include one or more of a head-mounted display, an optical head-mounted display, a see-through display, an optical see-through display, a video see-through display, a visor, eyeglasses, sunglasses, a smartphone, a tablet, a mobile device, a projector, and/or other displays.

The image sensor may be configured to generate visual output signals conveying visual information within a field of view of the image sensor. The image sensor may include one or more of a charge-coupled device sensor, an active pixel sensor, a complementary metal-oxide semiconductor sensor, an N-type metal-oxide-semiconductor sensor, and/or other image sensors.

The motion and orientation sensor may be carried by the handle and/or other physical objects. The motion and orientation sensor may be configured to generate motion and/or orientation output signals conveying motion and/or orientation information of the handle. In some implementations, the motion and orientation sensor may include an inertial measurement unit and/or other motion and orientation sensors.

The speaker may be carried by the handle and/or other physical objects. The speaker may be operated to provide procedural audio and/or other audio. The procedural audio may simulate the sounds of the virtual object. In some implementations, the speaker may be remote from the handle.

The one or more physical processors may be configured by machine-readable instructions. Executing the machine-readable instructions may cause the one or more physical processors to facilitate simulating sounds of a virtual object using procedural audio. The machine-readable instructions may include one or more computer program components. The computer program components may include one or more of a position and orientation component, a virtual object component, an overlay component, a display component, a procedural audio component, a speaker component, and/or other computer program components.

The position and orientation component may be configured to determine a position and/or an orientation for the virtual object based on the visual output signals, the motion and/or orientation output signals, and/or other information. When the handle is within the field of view of the image sensor, the position and orientation component may be configured to determine a position and/or an orientation for the virtual object based on the visual output signals and/or other information.

In some implementations, the position and orientation component may be configured to determine the position and/or the orientation for the virtual object based on a position and/or an orientation of a landmark, and/or other information. The landmark may be carried by the handle and/or other physical objects. The landmark may indicate a reference point for the handle that facilitates determination of a position and/or an orientation for the virtual object. In some implementations, the landmark may include a light emitting diode and/or other landmarks.

In some implementations, the position and orientation component may be configured to determine the position and/or the orientation for the virtual object based on the motion and/or orientation output signals. In some implementations, the position and orientation component may be configured to determine the position and/or the orientation for the virtual object based on the visual output signals and based on the motion and/or orientation output signals.

The position and orientation component may be configured to determine changes in the position and/or the orientation for the virtual object. In some implementations, determining changes in the position and/or the orientation for the virtual object may include determining changes in the position and/or the orientation of a tip of the virtual object and/or other parts of the virtual object. In some implementations, determining changes in the position and/or the orientation for the virtual object may include one or more of determining a speed of the virtual object, using a two-stage low-pass filter to determine a smoothed speed of the virtual object, and/or other operations.

In some implementations, the virtual object component may be configured to select the virtual object. The virtual object component may be configured to select the virtual object based on one or more of a user input received through an input device and/or a landmark. An input device may include one or more of a button device, a touch device, a point device, an imaging device, a sound device, and/or other input devices. In some implementations, the virtual object component may be configured to change the virtual object. The virtual object component may be configured to change one or more of a type, a shape, a size, a color, and/or other aspects of the virtual object.

The overlay component may be configured to determine an overlay image. The overlay image may comprise a virtual object, and/or other information. The virtual object may be placed within the overlay image according to the position and/or the orientation for the virtual object, and/or other information.

The display component may be configured to effectuate displaying of the overlay image on the display. The displaying may be effectuated so that the virtual object appears to augment the appearance of the handle.

The procedural audio component may be configured to determine the procedural audio based on changes in the position and/or the orientation for the virtual object. The procedural audio may include one or more modulations of one or more sounds, and/or other sounds. For example, the procedural audio may include a first modulation of the first sound, a second modulation of the second sound, and/or other sounds. In some implementations, the first modulation may include changes in one or more of a pitch, an amplitude, a timbre, and/or other aspects of the first sound. In some implementations, the second modulation may include changes in one or more of a pitch, an amplitude, a timbre, and/or other aspects of the second sound. In some implementations, the first modulation and the second modulation may include different changes in one or more of a pitch, an amplitude, a timbre, and/or other aspects of sounds.

One or more modulations may include a low-frequency oscillation multiplier and/or other changes. In some implementations, the first modulation may include a low-frequency oscillation multiplier and/or other changes. In some implementations, the second modulation may include a low-frequency oscillation multiplier, and/or other changes.

In some implementations, the procedural audio component may be configured to determine the procedural audio further based on the selected virtual object and/or other information. In some implementations, the procedural audio component may be configured to determine the procedural audio further based on the changed virtual object and/or other information.

The speaker component may be configured to effectuate operation of the speaker to provide the procedural audio and/or other audio. The procedural audio may simulate the sounds of the virtual object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 3A-3G illustrate examples of landmarks on handles.

FIGS. 4A-4D illustrate examples of virtual objects augmenting the appearances of handles.

DETAILED DESCRIPTION

Figure 1:
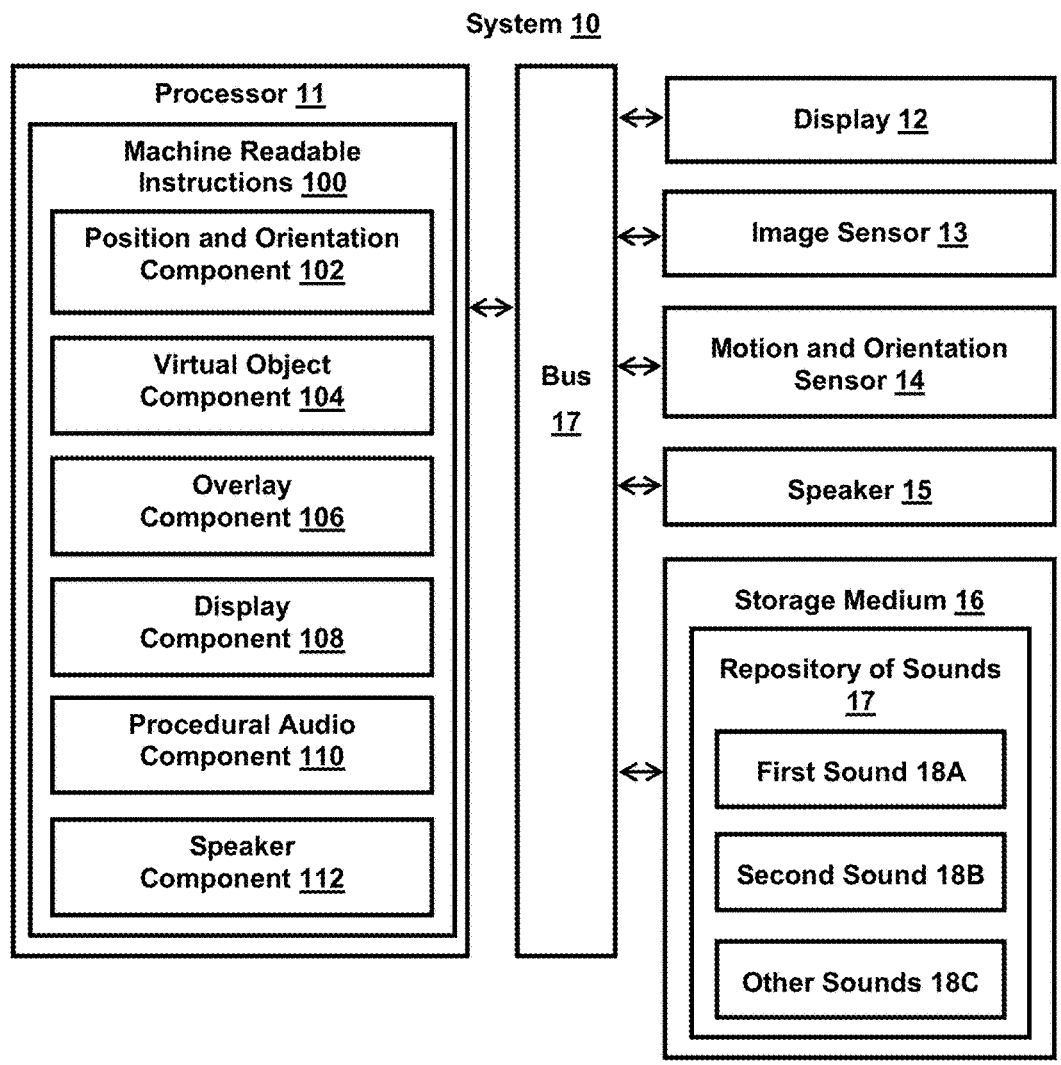
FIG. 1 illustrates a system configured to simulate sounds of a virtual object using procedural audio.

FIG. 1 illustrates a system 10 configured to simulate sounds of a virtual weapon using procedural audio. System 10 may include one or more of processor 11 motion and orientation sensor 14, speaker 15, storage medium 16, bus 17, a handle, and/or other components. In some implementations, system 11 may include display 12 and image sensor 13. The handle may be configured to carry (e.g., attach to, support, hold, and/or otherwise carry) one or more components of system 10. To simulate a sound of a virtual object, a position and/or an orientation for the virtual object may be determined. Changes in the position and/or the orientation for the virtual object may be determined and used to determine the procedural audio. The procedural audio may include a first modulation of a first sound, a second modulation of a second sound, and/or other sounds. A speaker may be operated to provide the procedural audio to simulate the sounds of the virtual object.

A virtual object may refer to an object generated by a computing device, such as processor 11. A virtual object may include a static object (e.g., a virtual blade, a virtual baseball bat, etc.) or a dynamic object (e.g., a virtual flame, etc.). Movements of a handle may cause movements of the virtual object. For example, a movement of a handle may cause a movement of a virtual blade. In some implementations, the virtual object may augment the appearance of the handle. For example, the handle may be presented on a display. A virtual baseball bat may augment the appearance of the handle on the display. A virtual object may appear to be attached to the handle and/or fixed at a relative distance to the handle. For example, a virtual blade may appear to be attached to the handle. A virtual object may appear to cover one or more portions of the handle. For example, a virtual baseball bat may appear to cover one or more portions of the handle. Other types and uses of virtual objects are contemplated.

Display 12 may be configured to display an overlay image and/or other information. Display 12 may include one or more devices that may present information visually. In some implementations, display 12 may include one or more screens of one or more display devices. In some implementations, display 12 may include one or more display devices. In some implementations, display 12 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, processor 11 and/or image sensor 13 may be carried on display 12. In some implementations, the field of view of image sensor 13 may be a function of the position and/or the orientation of display 12, and/or other information.

Image sensor 13 may be configured to generate visual output signals conveying visual information within the field of view of image sensor 13. Visual information may include one or more of an image, a video, and/or other visual information. When a handle is within the field of view of image sensor 13, visual information may include one or more of an image, a video, and/or other visual information regarding the handle. Image sensor 13 may include one or more of a charge-coupled device sensor, an active pixel sensor, a complementary metal-oxide semiconductor sensor, an N-type metal-oxide-semiconductor sensor, and/or other image sensors.

Motion and orientation sensor 14 may be carried by the handle and/or other physical objects. Motion and orientation sensor 14 may be configured to generate motion and/or orientation output signals conveying motion and/or orientation information of the handle. Motion and/or orientation information of the handle may characterize one or more motion and/or orientation of the handle. Motion of the handle may include one or more of movement of the handle, change in position of the handle, and/or other motion of the handle at a time or over a period of time. In some implementations, motion of the handle may include distance between display 12 and the handle at a time or over a period of time. Orientation of the handle may include one or more of yaw, pitch, and/or roll of the handle, change in yaw, pitch, and/or roll of the handle, and/or other orientation of handle at a time or over a period of time.

In some implementations, motion and orientation sensor 14 may include an inertial measurement unit and/or other motion and orientation sensors. An inertial measurement unit may include one or more of accelerometers, gyroscopes, magnetometers, and/or other motion and orientation sensors. An inertial measurement unit may include one or more of 3-DOF inertial measurement units, 6-DOF inertial measurement units, 9-DOF inertial measurement units, and/or other inertial measurement units. In some implementations, motion and orientation sensor 14 may include one or more distance sensors, such as infrared distance sensors, Lidar, ultrasonic distance sensors, and/or other distance sensors.

Speaker 15 may be operated to provide procedural audio and/or other audio. The procedural audio may simulate the sounds of the virtual object. Speaker 15 may include one or more transducers and/or other components that covert electrical signals/electromagnetic waves into sound waves. In some implementations, speaker 15 may be carried by the handle and/or other physical objects. In some implementations, speaker 15 may be remote from the handle and/or other physical objects. For example, speaker 15 may be carried by display 12. As another example, speaker 15 may be a free-standing speaker not physically attached to other components of system 10.

In some implementations, a landmark may be carried by the handle and/or other physical objects. The landmark may indicate a reference point for the handle that facilitates determination of a position and/or an orientation for the virtual object. In some implementations, the landmark may include an augmented reality marker, a light emitting diode, the entire shape of the handle, one or more parts of the handle, and/or other landmarks. An augmented reality marker may be two-dimensional or three-dimensional. As a non-limiting example, an augmented reality marker may include one or more of a sticker, a label, a barcode, a quick response (QR) code, and/or other augmented reality markers. In some implementations, a handle may include multiples types of landmarks. In some implementations, a landmark may be carried by the handle and/or other physical objects as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, the foregoing being incorporated herein by reference in its entirety. Other types of landmarks are contemplated.

Figure 3A:
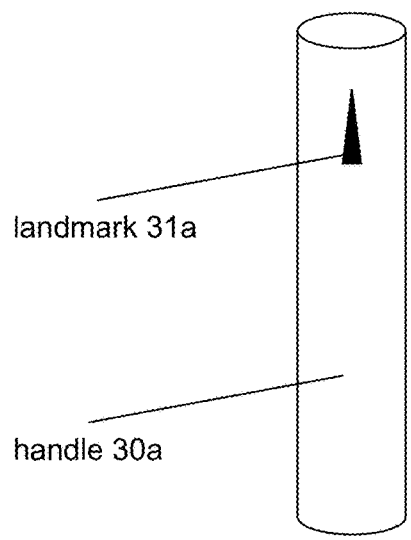
Figure 3B:
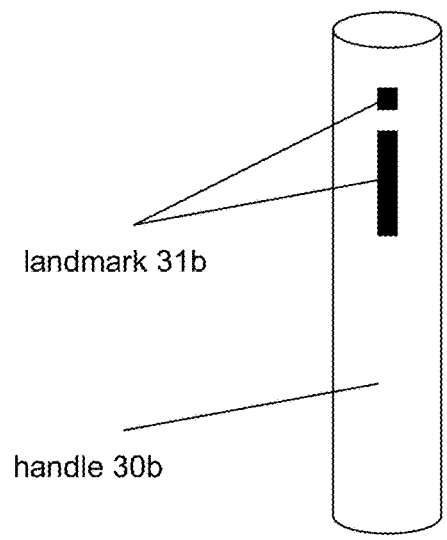
Figure 3C:
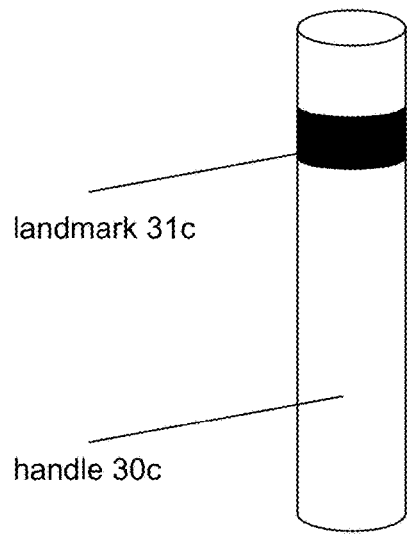
Figure 3D:
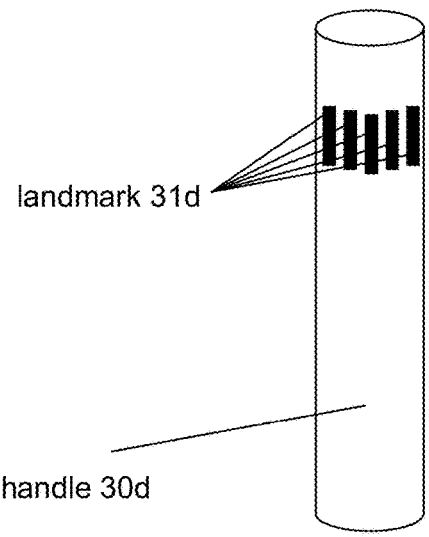

FIGS. 3A-3G provide non-limiting examples of landmarks 31 on handles 30. In FIG. 3A, handles 30a includes landmark 31a, and landmark 31a is triangular in shape. In FIG. 3B, handles 30b includes landmark 31b, and landmark 31b looks like an upside-down exclamation mark. In FIG. 3C, handles 30c includes landmark 31c, and landmark 31c is a rectangular band running around handles 30c. In FIG. 3D, handles 30d includes landmark 31d, and landmark 31d looks like long rectangles running around handles 30d. In FIG. 3E, handles 30e includes landmark 31e, and landmark 31e is a cylindrical blade attached to handles 30e. In FIG. 3F, handles 30f includes landmark 31f, and landmark 31f is a short cylindrical blade attached to handles 30f. In FIG. 3G, handles 30g includes landmark 31g, and landmark 31g is a rounded diffuser attached to handles 30g. Landmarks 31 in FIGS. 3A-3G may include one or more light emitting diodes and/or other lighting elements. Other shapes and configurations of landmarks are contemplated.

In some implementations, a handles may include multiples types of landmarks. For example, handles 30c may include landmark 31c (shown in FIG. 3C) on the front and landmark 31d (shown in FIG. 3D) on the back. Other combinations of landmarks are contemplated.

Storage medium 16 may include electronic storage media that electronically stores information. Storage medium 16 may store software algorithms, information determined by processor 11, information received remotely, and/or other information that enables system 10 to function properly. For example, storage medium 16 may store visual information (as discussed elsewhere herein), information relating to virtual objects, information relating to procedural audio, information relating to operation of speaker 15, and/or other information. System 10 may include electronic storage separate from storage medium 16. Electronic storage separate from storage media may perform one or more of the functionalities of storage medium 16 discussed herein.

Storage medium 16 may store repository of sounds 17 and/or other information. Repository of sounds 17 may include one or more sounds and/or other information. For example, repository of sounds 17 may include first sound 16A, second sound 16B, and/or other sounds 16C. In some implementations, first sound 16A may include a base tone and/or other sounds. In some implementations, second sound 16B may include an overtone and/or other sounds. The length of first sound 16A, second sound 16B, and/or other sounds 16C may be the same or may differ. For example, the length of first sound 16A, second sound 16B, and/or other sounds 16C may all be ten seconds in length. As another example, the length of first sound 16A and other sounds 16C may be two seconds in length while the length of second sound 16B may be thirty seconds in length. As another example, the length of first sound 16A may be five seconds in length, the length of second sound 16B may be six seconds in length, and the length of other sounds may be of other lengths. Other lengths of sounds are contemplated.

One or more sounds of repository of sounds 17 may include a constant sound that does not vary over time. One or more sounds of repository of sounds 17 may include a varying sound that varies over time. For example, first sound 16A may include a base tone and/or other sounds that include variations in one or more of amplitude, pitch, and/or timbre over time. As another example, second sound 16B may include an overtone and/or other sounds that include variations in one or more of amplitude, pitch, and/or timbre over time. There may be more variations in first sound 16A than in second sound 16B. Other combinations of constant and/or varying sounds are contemplated.

One or more sounds of repository of sounds 17 may be louder than one or more other sounds of repository of sounds 17. For example, first sound 16A (e.g., base tone and/or other sounds) may be louder than second sound 16B (e.g., overtone and/or other sounds) and/or other sounds 16C. Other volumes of sounds are contemplated.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate simulating sounds of a virtual object using procedural audio. Machine readable instructions 100 may include one or more of position and orientation component 102, virtual object component 104, overlay component 106, display component 108, procedural audio component 110, speaker component 112, and/or other components.

Position and orientation component 102 may be configured to determine a position and/or an orientation for the virtual object based on the visual output signals and/or the motion and/or orientation output signals. When the handle is within the field of view of image sensor 13, position and orientation component 102 may be configured to determine a position and/or an orientation for the virtual object based on the visual output signals conveying visual information within the field of view of image sensor 13.

In some implementations, position and orientation component 102 may detect a handle based on the visual output signals. Position and orientation component 102 may determine a position and/or an orientation of the handle. Position and orientation component 102 may include or retrieve information (for example, a database, etc.) that matches a detected handle to a position and/or an orientation for a virtual object. For example, position and orientation component 102 may determine a position for a virtual object based on the position of the handle, and/or an orientation for the virtual object based on the orientation of the handle.

In some implementations, position and orientation component 102 may be configured to determine the position and/or the orientation for the virtual object based on a position and/or an orientation of a landmark. The landmark may be carried by the handle and/or other physical objects. The landmark may indicate a reference point for the handle and/or other physical objects that facilitates determination of a position and/or an orientation (yaw, pitch, and/or roll) for the virtual object. In some implementations, the landmark may include a light emitting diode and/or other landmarks.

Position and orientation component 102 may include or retrieve information (for example, a database, etc.) that matches a detected landmark to a position and/or an orientation for a virtual object relative to the position and/or the orientation of the landmark. For example, position and orientation component 102 may determine the position for a virtual object based on the position of a landmark, and/or the orientation for the virtual object based on the orientation of the landmark. In some implementations, the position and/or the orientation for the virtual object may be determined using systems and methods described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

FIGS. 4A-4D illustrate non-limiting examples of positions and orientations of virtual objects 40 (e.g., virtual blades, etc.) determined based on positions and orientations of landmarks 31. For example, position and orientation component 102 may detect landmark 31a (shown in FIG. 4A) and determine a position and/or an orientation of landmark 31a. Position and orientation component 102 may determine a position and/or an orientation of virtual object 40a based on the position and/or the orientation of landmark 31a. Landmark 31a may indicate the position and/or orientation of virtual object 40a. For example, the position of virtual object 40a may be indicated by certain distances from landmark 31a (e.g., the right, left, top, and/or bottom positions of virtual object 40a are determined by certain distances to the right, left, above, and/or below landmark 31a). The orientation of virtual object 40a may be indicated by the orientation of landmark 31a (e.g., the pointed end of landmark 31a points toward virtual object 40a).

As another example, position and orientation component 102 may detect landmark 31b (shown in FIG. 4B) and determine a position and/or an orientation of landmark 31b. Position and orientation component 102 may determine a position and/or an orientation of virtual object 40b based on the position and/or the orientation of landmark 31b. Landmark 31b may indicate the position and/or orientation of virtual object 40b. For example, the position of virtual object 40b may be indicated by certain distances from landmark 31b (e.g., the right, left, top, and/or bottom positions of virtual object 40b are determined by certain distances to the right, left, above, and/or below landmark 31b). The orientation of virtual object 40b may be indicated by the orientation of landmark 31b (e.g., the dot-side of landmark 31b points toward one end of virtual object 40b).

As another example, position and orientation component 102 may detect both landmark 31c (shown in FIG. 3C) and landmark 31d (shown in FIG. 3D) on handle 30c and determine positions and/or orientations of landmark 31c and landmark 31d. Position and orientation component 102 may determine a position and/or an orientation of virtual object 40c (shown in FIG. 4C) based on the position(s) and/or the orientation(s) of landmark 31c and/or landmark 31d. Landmark 31c and landmark 31d may indicate the position and/or orientation of virtual object 40c. For example, the position of virtual object 40c may be indicated by certain distances from landmark 31c and/or landmark 31d (e.g., the right, left, top, and/or bottom positions of virtual object 40c are determined by certain distances to the right, left, above, and/or below landmark 31c and/or landmark 31d). The orientation of virtual object 40c may be indicated by the orientation of landmark 31c and/or landmark 31d (e.g., the end of handle 30c close to landmark 31c and/or landmark 31d is close to the start of virtual object 40c, the front of virtual object 40c is indicated by landmark 31c, and the back of virtual object 40c is indicated by landmark 31d).

As another example, position and orientation component 102 may detect landmark 31e (shown in FIG. 3E) and determine a position and/or an orientation of landmark 31e. Position and orientation component 102 may determine a position and/or an orientation of virtual object 40e (shown in FIG. 4D) based on the position and/or the orientation of landmark 31e. Landmark 31e may indicate the position and/or orientation of virtual object 40e. For example, the position of virtual object 40e may be indicated by certain distances from landmark 31e (e.g., the right, left, top, and/or bottom positions of virtual object 40*b* are determined by certain the right, left, above, and/or bottom positions of landmark 31*e*). The orientation of virtual object 40*e* may be indicated by the orientation of landmark 31*e* (e.g., the orientation of landmark 31*e* is the orientation of virtual object 40*e*).

In some implementations, position and orientation component 102 may be configured to determine the position and/or the orientation for the virtual object based on the motion and/or orientation output signals. Position and orientation component 102 may determine changes in position and/or orientation of the handle based on the motion and/or orientation output signals. Position and orientation component 102 may determine the position and/or the orientation for the virtual object based on the changes in the position and/or the orientation of the handle. In some implementations, position and orientation component 102 may determine the position and/or the orientation of the handle with respect to display 12 based on systems and methods described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

In some implementations, position and orientation component 102 may be configured to determine a position and/or an orientation for a virtual object based on the visual output signals and based on the motion and/or orientation output signals. For example, position and orientation component 102 may be configured to determine a position and/or an orientation for the virtual object based on the visual output signals, and to adjust the position and/or the orientation for the virtual object based on the motion and/or orientation output signals. Such a determination of the position and/or the orientation for a virtual object may increase the accuracy of the position and/or the orientation for the virtual object.

In some implementations, position and orientation component 102 may be configured to determine a position and/or an orientation for the virtual object based on a previously determined position and/or a previously determined orientation for the virtual object, and based on the motion and/or orientation output. For example, position and orientation component 102 may have determined a position and/or an orientation for the virtual object, and may then determine a new position and/or a new orientation for the virtual object based on the motion and/or orientation output signals. Such a determination of the new position and/or the new orientation for a virtual object may allow position and orientation component 102 to avoid any latency arising from determining a position and/or an orientation for a virtual object based on the visual output signals.

Position and orientation component 102 may be configured to determine changes in a position and/or an orientation for a virtual object. Changes in a position and/or an orientation for a virtual object may include information regarding changes in a position and/or an orientation for a virtual object at a time, over a period of time, at a location, or over a range of locations. For example, changes in a position and/or an orientation for a virtual object may include one or more information regarding change in position, direction of position change, speed of position change, acceleration of position change, change in orientation, direction of orientation change, speed of orientation change, acceleration of orientation change, and/or other information regarding changes in a position and/or an orientation for the virtual object.

Position and orientation component 102 may determine changes in a position and/or an orientation for a virtual object based on the visual output signals and/or the motion and orientation signals. For example, when the handle is within the field of view of image sensor 13, position and orientation component 102 may determine changes in a position and/or an orientation for a virtual object based on the visual output signals. As another example, when the handle is not within the field of view of image sensor 13, position and orientation component 102 may determine changes in a position and/or an orientation for the virtual object based on the motion and/or orientation output signals. In some implementations, position and orientation component 102 may determine changes in a position and/or an orientation for a virtual object based on the visual output signals and based on the motion and/or orientation output signals.

Figures 5A, 5B:
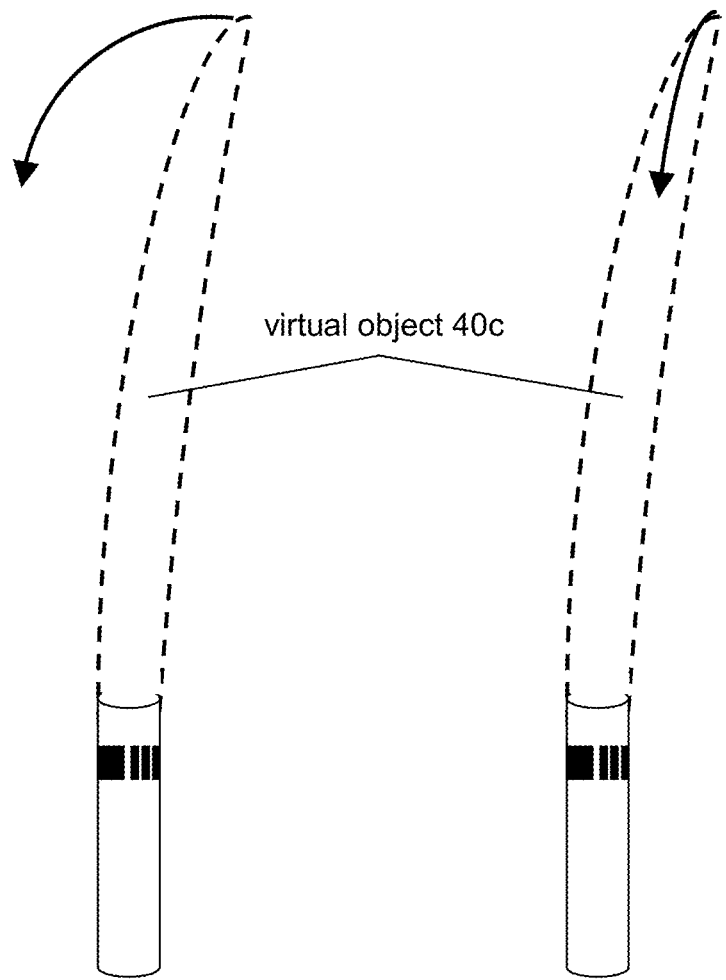
FIGS. 5A-5B illustrate examples of virtual object movements.

In some implementations, determining changes in the position and/or the orientation for the virtual object may include determining changes in the position and/or the orientation of a tip of the virtual object and/or other parts of the virtual object. For example, FIGS. 5A and 5B illustrate non-limiting examples of movements of virtual object 40*c*. In FIG. 5A, virtual object 40*c* may move down and forward, simulating a slashing down movement of a virtual weapon. In FIG. 5B, virtual object 40*c* may move down and left, simulating a virtual weapon changing position from an up-right position to a horizontal position.

Position and orientation component 102 may determine changes in a position and/or an orientation of a tip of virtual object 40*c* and/or other parts of virtual object 40*c*. For example, position and orientation component 102 may determine the changes in the position and/or the orientation of the tip of virtual object 40*c* and/or other parts of virtual object 40*c* as virtual object 40*c* is slashed downwards (e.g., as shown in FIG. 5A, etc.). As another example, position and orientation component 102 may determine the changes in the position and/or the orientation of the tip of virtual object 40*c* and/or other parts of virtual object 40*c* as virtual object 40*c* is moved left to a horizontal position (e.g., as shown in FIG. 5B, etc.). Position and orientation component 102 may determine the changes in a position and/or an orientation of the tip of virtual object 40*c* and/or other parts of virtual object 40*c* at a time, over a period of time, at a location, or over a range of locations.

In some implementations, determining changes in the position and/or the orientation for the virtual object may include one or more of determining a speed and/or acceleration of the virtual object, using a low-pass filter to determine a smoothed speed and/or acceleration of the virtual object, and/or other operations. For example, position and orientation component 102 may determine the speed and/or acceleration of the tip of virtual object 40*c* and/or other parts of virtual object 40*c* as virtual object 40*c* is moved as shown in FIG. 5A and/or FIG. 5B. The determined speed and/or acceleration of the tip of virtual object 40*c* and/or other parts of virtual object 40*c* may be smoothed out by using a two-stage low-pass filter.

In some implementations, virtual object component 104 may be configured to select a virtual object. For example, virtual object component 104 may select a virtual blade as the virtual object. A virtual blade may be a blade of a real weapon, such as a broadsword, an axe, or a katana, or a fictional weapon, such as a lightsaber. Other virtual objects and virtual blades are contemplated. In some implementations, virtual object component 104 may be configured to select the virtual object based on a user input received through an input device. An input device may refer to a device that allows a user to input information. For example, an input device may include a button device, a touch device, a point device, an imaging device, a sound device, and/or other input devices. A user input may refer to one or more information provided by a user through an input device.

A button device may include a device that allows a user to provide one or more user inputs by using one or more buttons on a device. For example, a user may provide one or more user inputs by typing one or more of characters, numbers, symbols, and/or other input using the button device. As another example, a user may provide one or more user inputs by using one or more buttons corresponding to different user input. A button device may include a separate device or a part of another device. For example, a button device may include a keyboard/buttons coupled to processor 11. As another example, a button device may include a game controller coupled to processor 11. A user may provide one or more user inputs by using one or more buttons on a button device. For example, a user may provide one or more user inputs by using one or more buttons corresponding to one or more of a type, shape, size, color, and/or other information about the virtual object.

A touch device may include a device that allows a user to provide user inputs by touching a user interface of the touch device. A touch device may include a separate device or a part of another device. For example, a touch device may include a touch screen coupled to processor 11. As another example, a touch device may include a mobile device coupled to processor 11. A user may provide one or more user inputs by touching one or more portions of the touch device corresponding to one or more information. For example, a user may provide one or more user inputs by touching one or more portions of the touch device corresponding to one or more of a type, shape, size, color, and/or other information about the virtual object.

A point device may include a device that allows a user to provide user inputs by pointing to one or more locations in a user interface. A user interface may be displayed on display 12 or on other displays. A point device may include a separate device or a part of another device. For example, a point device may include a mouse coupled to processor 11. A user may provide one or more user inputs by pointing a cursor controlled by the point device to one or more locations in a user interface corresponding to one or more information. For example, a user may provide one or more user inputs by pointing to one or more locations in a user interface corresponding to one or more of a type, shape, size, color, and/or other information about the virtual object.

An imaging device may include a device that allows a user to provide user inputs by using an image sensor of the imaging device. An imaging device may include a separate device or a part of another device. For example, an imaging device may include an image sensor coupled to processor 11. As a non-limiting example, an imaging device may include image sensor 13. As another example, an imaging device may include a mobile device coupled to processor 11. A user may provide one or more user inputs by directing the field of view of the imaging device to objects that include information. For example, a user may provide one or more user inputs by directing the field of view of the imaging device to a landmark, an augmented reality marker, and/or other objects that include one or more of a type, shape, size, color, and/or other information about the virtual object.

A sound device may include a device that allows a user to provide user inputs through voice and/or sounds. A sound device may include a separate device or part of another device. For example, a sound device may include a microphone coupled to processor 11. As another example, a sound device may include a mobile device coupled to processor 11. A user may provide one or more user input by speaking one or more information. For example, a user may provide one or more user inputs by speaking one or more of a type, shape, size, color, and/or other information about the virtual object.

In some implementations, virtual object component 104 may be configured to select the virtual object based on a landmark. Virtual object component 104 may include or retrieve information (for example, a database, etc.) that matches a landmark to a particular virtual object. In some implementations, the virtual object may be selected as described in U.S. patent application Ser. No. 15/001,160, entitled "SYSTEMS AND METHODS FOR AUGMENTING AN APPEARANCE OF A HILT TO SIMULATE A BLADED WEAPON," filed Jan. 19, 2016, incorporated supra.

Figure 4A:
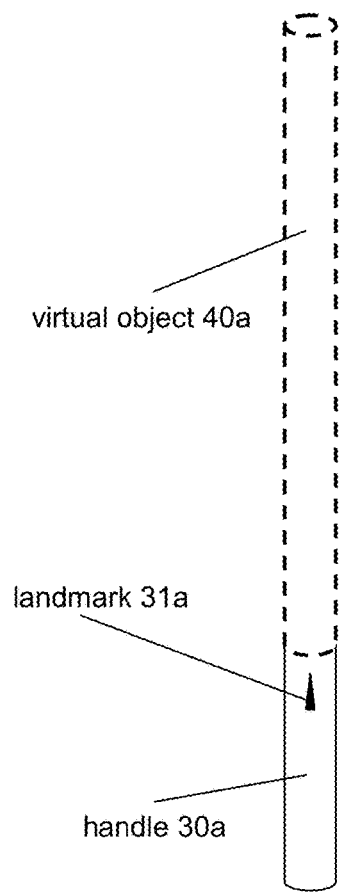
Figure 4B:
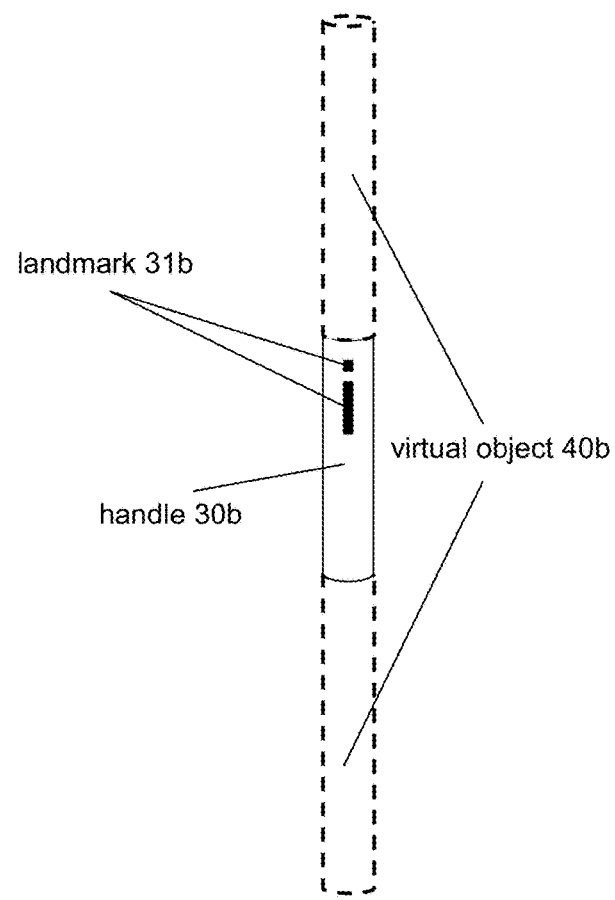

FIGS. 4A-4D illustrate non-limiting examples of virtual objects selected by virtual object component 104 based on landmarks 31. In FIG. 4A, virtual object component 104 may select virtual object 40*a* based on landmark 31*a*. Virtual object 40*a* is cylindrical in shape and appears to extend outwardly from top of handle 30*a*. In FIG. 4B, virtual object component 104 may select virtual object 40*b* based on landmark 31*b*. Virtual object 40*b* is cylindrical in shape and appears to extend outwardly from top and bottom of handle 30*b*.

In FIG. 4C, virtual object component 104 may select virtual object 40*c* based on landmark 31*c* and landmark 31*d*. Virtual object 40*c* is curved and appears to extend outwardly from top of handle 30*c*. Virtual object 40*c* curves towards the back of handle 30*c*, with landmark 31*d* indicating the back of handle 30*c* and landmark 31*c* indicating the front of handle 30*c*.

In FIG. 4D, virtual object component 104 may select virtual object 40*e* based on landmark 31*e* (shown in FIG. 3E). Virtual object 40*e* is cylindrical in shape appears to extend outwardly from top of handle 30*e*. When virtual object 40*e* appears on top of handle 30*e*, landmark 31*e* may not be visible.

As another example, virtual object component 104 may select virtual object 40*e* (shown in FIG. 4D) based on landmark 31*f* (shown in FIG. 3F) and/or landmark 31*g* (shown in FIG. 3G). When virtual object 40*e* appears on top of handle 30*f*, landmark 31*f* may not be visible. Virtual object 40*e* may be longer than landmark 31*f*. When virtual object 40*e* appears on top of handle 30*g*, landmark 31*g* may not be visible. Virtual object 40*e* may be larger than landmark 31*g*. Other selections of virtual objects based on landmarks are contemplated.

Figures 6A, 6B:
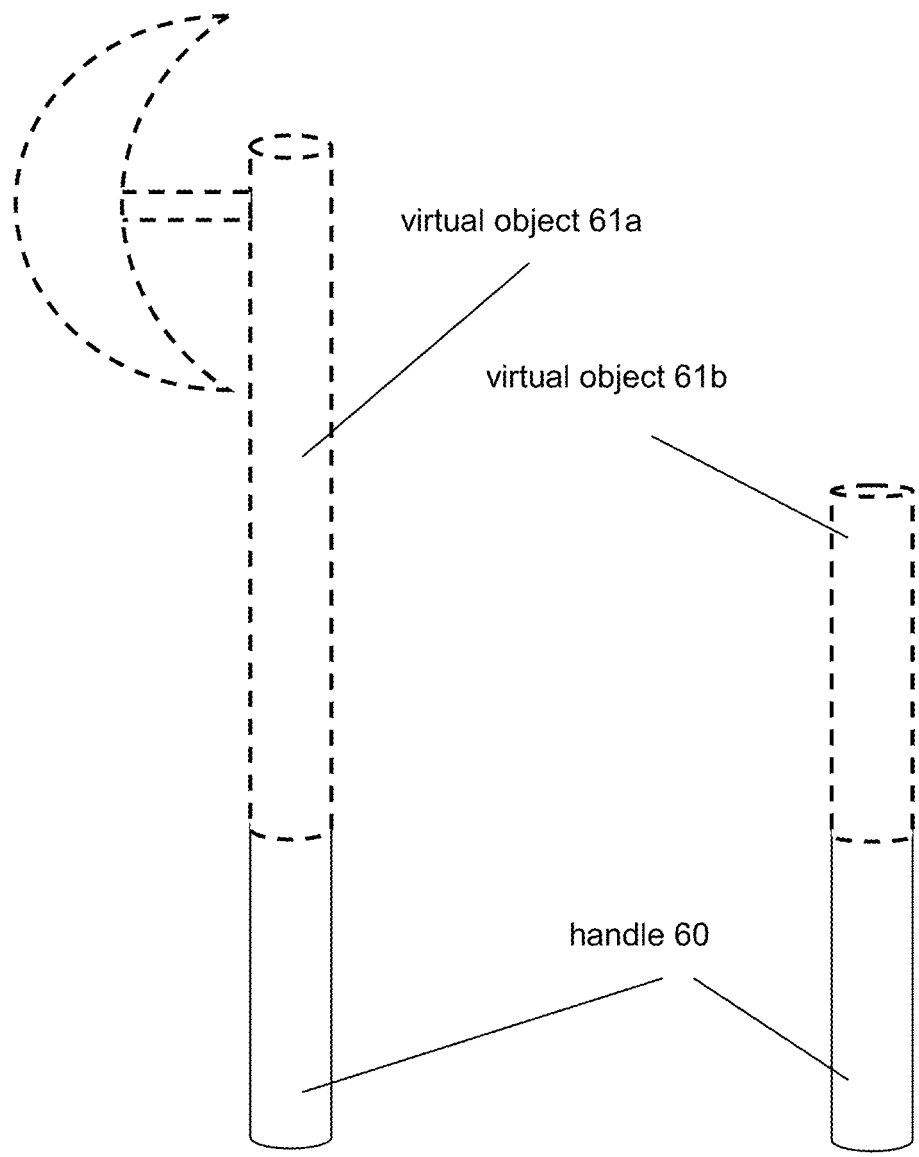
FIGS. 6A-6B illustrate examples of changing virtual objects.

In some implementations, virtual object component 104 may be configured to change the virtual object. Virtual object component 104 may be configured to change a type, a shape, and/or a size of the virtual object. For example, as shown in FIGS. 6A and 6B, virtual object component 104 may change virtual object 61 for handle 60. In FIG. 6A, virtual object 61*a* appears as a blade of an axe. In FIG. 6B, virtual object 61*b* appears as a short cylinder, simulating the top portion of the axe blade having broken off. Other types of changes in a virtual object are contemplated. In some implementations, virtual object component 104 may be configured to change the virtual object based on a user input received through an input device. In some implementations, virtual object component 104 may be configured to change the virtual object based on a use of the virtual object and/or interaction of the virtual object with physical and/or virtual objects.

Overlay component 106 may be configured to determine an overlay image. The overlay image may include a virtual object (e.g., a virtual blade of a virtual weapon, a virtual baseball bat, etc.) determined by virtual object component 104, and/or other information. The virtual object may be placed within the overlay image according to the position and/or the orientation for the virtual object, and/or other information. The position and/or the orientation for the virtual object may change how the virtual object appears within the overlay image. For example, the position and/or the orientation for the virtual object may change one or more of the position, the size, the shape, the tilt, the rotation, and/or other appearances of the virtual object.

Display component 108 may be configured to effectuate displaying of an overlay image and/or other information on display 12. The displaying may be effectuated so that the virtual object appears to augment the appearance of the handle. In some implementations, display component 108 may be configured to effectuate displaying of an overlay image within one or more of an image, a video, and/or other visual information based on the visual output signals generated by image sensor 13.

In some implementations, display component 108 may be configured to effectuate displaying of an overlay image on display 12, which allows light to be passed through display 12 in portions in which the overlay image does not contain the virtual object. For example, display 12 may include one or more of an optical head-mounted display and a user of display 12 may see light from the real world as well as the overlay image. In some implementations, display component 108 may be configured to change the transparency of one or more portions of display 12. For example, display component 108 may change the transparency of one or more portions of display 12 corresponding to the virtual object to block light from the real world passing through display 12.

Procedural audio component 110 may be configured to determine the procedural audio based on the changes in the position and/or the orientation for the virtual object. The procedural audio may include modulations of one or more sounds, and/or other sounds. For example, the procedural audio may include a first modulation of first sound 18A, a second modulation of second sound 18B, and/or other sounds 18C. The procedural audio may include a loop of one or more of a first modulation of first sound 18A, a second modulation of second sound 18B, and/or other sounds 18C. In some implementations, the first modulation may include changes in one or more of a pitch, an amplitude, a timbre, and/or other aspects of first sound 18A. In some implementations, the second modulation may include changes in one or more of a pitch, an amplitude, a timbre, and/or other aspects of second sound 18B. In some implementations, the first modulation may include changes in one or more of a pitch and/or amplitude of first sound 18A and the second modulation may include changes in one or more of a pitch and/or amplitude of second sound 18B. In some implementations, the first modulation may not include changes in a timbre of first sound 18A and the second modulation may include changes in a timbre of second sound 18B.

Modulation of one or more sounds may be based on the changes in the position and/or the orientation for the virtual object. For example, modulation of one or more sounds may be based on one or more of a change in position, a direction of position change, a speed of position change, an acceleration of position change, a change in orientation, a direction of orientation change, a speed of orientation change, an acceleration of orientation change, and/or other changes in the position and/or the orientation for the virtual object.

For example, procedural audio component 110 may modulate one or more of first sound 18A, second sound 18B, and/or other sounds 18C based on a speed and/or an acceleration of the tip of virtual object 40C and/or other parts of virtual object. Modulation of one or more of first sound 18A, second sound 18B, and/or other sounds 18C may increase or decrease one or more of aspects of first sound 18A, second sound 18B, and/or other sounds 18C. For example, a multiplier for modulation of one or more of aspects of first sound 18A, second sound 18B, and/or other sounds 18C may be determined by using an exponential relationship between the speed and/or the acceleration and a multiplier for one or more aspects of first sound 18A, second sound 18B, and/or other sounds 18C. For example, the exponential relationship between the speed and/or the acceleration and the multiplier for pitch of one or more sounds may be represented on a velocity/acceleration vs pitch curve, where the pitch is plotted against some factor of the square root of velocity/acceleration.

As another example, the same and/or similar relationships may be used to determine the modulation of amplitude and/or timbre of one or more of first sound 18A, second sound 18B, and/or other sounds 18C. For example, the same relationship may be used to determine the modulation of amplitude of first sound 18A and second sound 18B, and a similar relationship (e.g., using different multiplier(s)) may be used to determine the modulation of timber of second sound 18B. Other relationships between the speed and/or an acceleration of the virtual object and modulation of one or more aspects of sounds are contemplated.

In some implementations, one or more modulations may include a low-frequency oscillation multiplier and/or other changes. The low-frequency oscillation multiplier may include a combination of multiple sound waves. For example, the low-frequency oscillation multiplier may include a combination of multiple sine waves (e.g., three sine waves, etc.) to provide sound that may appear to be random. The low-frequency oscillation multiplier may change one or more of a pitch, an amplitude, a timbre, and/or other aspects of one or more sounds. For example, changes in pitch in one or more of the first modulation and/or the second modulation may change one or more pitches of first sound 18A and/or second sound 18B. Such application of the low-frequency oscillation multiplier may result in procedural audio component 110 determining different procedural audio for same movements of the virtual object. For example, the virtual object may be moved through two identical slashing down movements (e.g., as shown in FIG. 5A). Application of the low-frequency oscillation multiplier may result in procedural audio component 110 determining different procedural audio for the two identical slashing down movements.

As another example, procedural audio component 110 may modulate one or more of first sound 18A, second sound 18B, and/or other sounds 18C based on changes in orientation of a virtual object. For example, procedural audio component 110 may modulate one or more of first sound 18A, second sound 18B, and/or other sounds 18C based on whether the virtual object is being slashed, thrusted, shifted, and/or other movement of the virtual object. For example, in response to virtual object 40c moving in slashing movement as shown in FIG. 5A, procedural audio component 110 may modulate one or more of first sound 18A, second sound 18B, and/or other sounds 18C to produce a sharper cutting sound than when virtual object 40c is moving as shown in FIG. 5B. As another example, virtual object 40c may start moving as shown in FIG. 5B, and the orientation of virtual object 40c may change to orient the front (curved) portion of virtual object 40c in the direction of the movement. Procedural audio component 110 may modulate one or more of first sound 18A, second sound 18B, and/or other sounds 18C to produce a sound that becomes sharper as the orientation of virtual object aligns in the direction of the movement. Other modulations of one or more sounds based on changes in orientation of a virtual object are contemplated.

In some implementations, procedural audio component 110 may be configured to determine the procedural audio further based on a selected virtual object and/or other information. For example, procedural audio component 110 may determine procedural audio differently based on one or more of a type, a shape and/or a size of the virtual object. For example, procedural audio component 110 may determine procedural audio differently for virtual object 40c (shown in FIG. 4C) and virtual object 40e (shown in FIG. 4D). For example, changes in orientation of virtual object 40c may result in greater changes to procedural audio than changes in orientation of virtual object 40e.

In some implementations, procedural audio component 110 may be configured to determine the procedural audio further based on the changed virtual object and/or other information. For example, in response to interaction of virtual object 61a (shown in FIG. 6A) with physical and/or virtual objects, virtual object 61a may be changed to virtual object 61b (shown in FIG. 6B) (e.g., simulating virtual object 61a breaking off, etc.). Procedural audio component 110 may determine procedural audio for virtual object 61b differently than procedural audio for virtual object 61a. For example, procedural audio for virtual object 61b may be determined so that the procedural audio simulates the sound of a short rod instead of an axe.

Speaker component 112 may be configured to effectuate operation of speaker 15 to provide the procedural audio and/or other audio. The procedural audio may simulate the sounds of the virtual object. For example, virtual object component 104 may have selected a virtual blade of a lightsaber as the virtual object for a handle. When the virtual object is motionless, procedural audio component 110 may determine procedural audio that simulates a buzzing/humming sound of a motionless lightsaber. Speaker component 112 may effectuate operation of speaker to produce the procedural audio that simulates the buzzing/humming sound of the motionless lightsaber. As another example, when the virtual object is moving, procedural audio component 110 may determine procedural audio that simulates a "wah" sound of a moving lightsaber. Speaker component 112 may effectuate operation of speaker to produce the procedural audio that simulates the "wah" sound of the moving lightsaber. Other operations of speaker 15 are contemplated.

Although processor 11, display 12, image sensor 13, motion and orientation sensor 14, speaker 15, and storage medium 16 are shown to be connected to a bus 17 in FIG. 1, any communication medium may be used to facilitate interaction between any components of system 10. One or more components of system 10 may communicate with each other through hard-wired communication, wireless communication, or both. For example, processor 11 may wirelessly communicate with motion and orientation sensor 14. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination.

Processor 11 may be configured to execute one or more of position and orientation component 102, virtual object component 104, overlay component 106, display component 108, procedural audio component 110, speaker component 112 and/or other components by software; hardware; firmware; some combination of software, hardware, and/or firmware; and/or other mechanisms for configuring processing capabilities on processor 11.

It should be appreciated that although position and orientation component 102, virtual object component 104, overlay component 106, display component 108, procedural audio component 110, and speaker component 112 are illustrated in FIG. 1 as being co-located within a single processing unit, in implementations in which processor 11 comprises multiple processing units, one or more of position and orientation component 102, virtual object component 104, overlay component 106, display component 108, procedural audio component 110, and/or speaker component 112 may be located remotely from the other computer program components.

The description of the functionality provided by the different computer program components 102, 104, 106, 108, 110, and/or 112 described herein is for illustrative purposes, and is not intended to be limiting, as any of computer program components 102, 104, 106, 108, 110, and/or 112 may provide more or less functionality than is described. For example, one or more of computer program components 102, 104, 106, 108, 110, and/or 112 may be eliminated, and some or all of its functionality may be provided by other computer program components 102, 104, 106, 108, 110, and/or 112. As another example, processor 11 may be configured to execute one or more additional computer program components that may perform some or all of the functionality attributed to one or more of computer program components 102, 104, 106, 108, 110, and/or 112.

Although display 12 is depicted in FIG. 1 as a single element, this is not intended to be limiting. Display 12 may include one or more displays in one or more locations.

Although image sensor 13 is depicted in FIG. 1 as a single element, this is not intended to be limiting. Image sensor 13 may include one or more image sensors in one or more locations.

Although motion and orientation sensor 14 is depicted in FIG. 1 as single elements, this is not intended to be limiting. Motion and orientation sensor 14 may include one or more motion and orientation sensors in one or more locations.

Although speaker 15 is depicted in FIG. 1 as single elements, this is not intended to be limiting. Speaker 15 may include one or more speakers in one or more locations.

The electronic storage media of storage medium 16 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Storage medium 16 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage medium 16 may be a separate component within system 10, or storage medium 16 may be provided integrally with one or more other components of system 10 (e.g., processor 11). Although storage medium 16 is shown in FIG. 1 as a single entity, this is for illustrative purposes only. In some implementations, storage medium 16 may comprise a plurality of storage units. These storage units may be physically located within the same device, or storage medium 16 may represent storage functionality of a plurality of devices operating in coordination.

Figure 2:
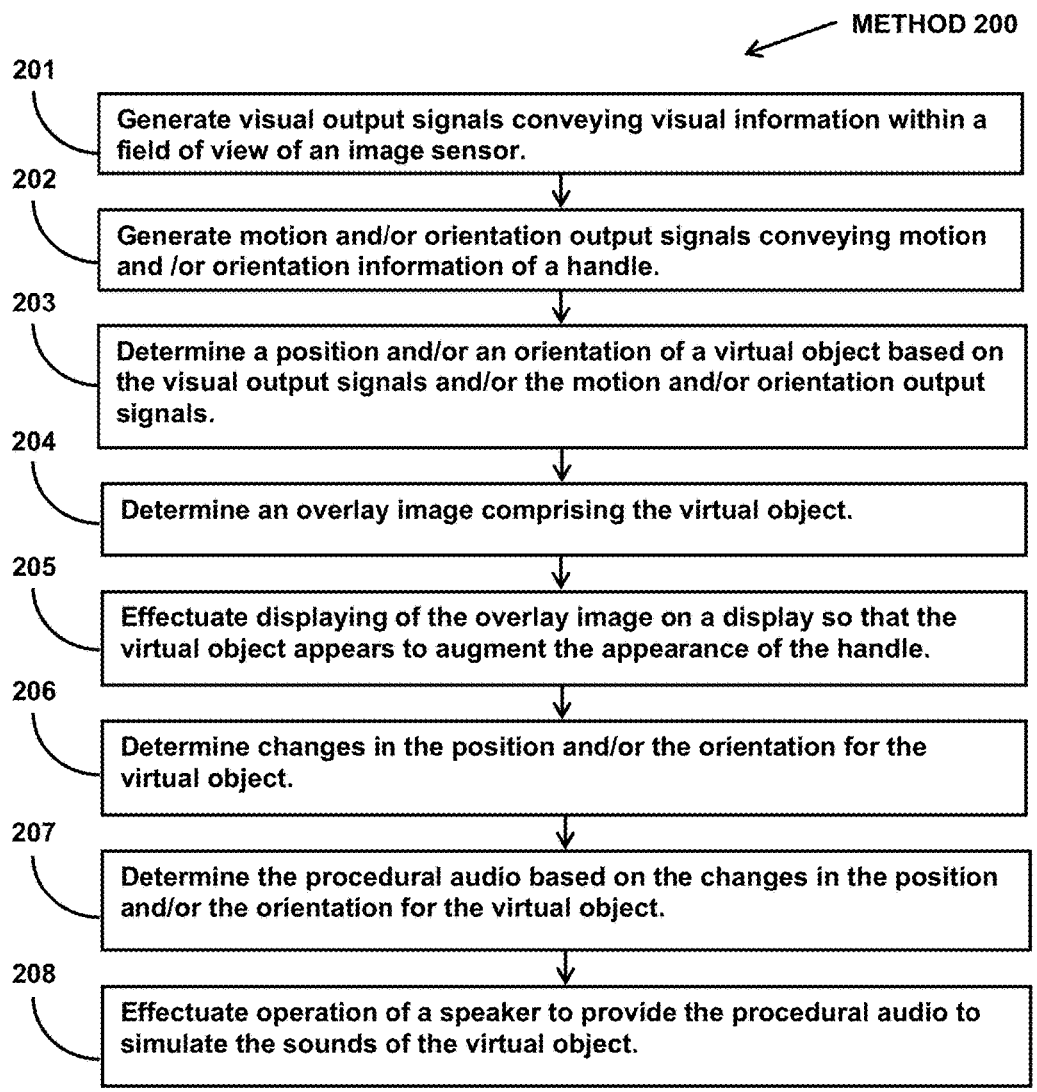
FIG. 2 illustrates a method for simulating sounds of a virtual object using procedural audio.

FIG. 2 illustrates method 200 for simulating sounds of a virtual object using procedural audio. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, visual output signals conveying visual information within a field of view of an image sensor may be generated. Visual information may include one or more of an image, a video, and/or other visual information. In some implementations, operation 201 may be performed by one or more sensors the same as or similar to image sensor 13 (shown in FIG. 1 and described herein).

At operation 202, motion and/or orientation output signals conveying motion and/or orientation information of a handle may be generated. In some implementations, operation 202 may be performed by one or more sensors the same as or similar to motion and orientation sensor 14 (shown in FIG. 1 and described herein).

At operation 203, a position and/or an orientation for a virtual object may be determined based on the visual output signals and/or the motion and/or orientation output signals. In some implementations, operation 203 may be performed by a processor component the same as or similar to position and orientation component 102 (shown in FIG. 1 and described herein).

At operation 204, an overlay image comprising the virtual object may be determined. The virtual object may be placed within the overly image according to the position and/or the orientation for the virtual object. In some implementations, operation 204 may be performed by a processor component the same as or similar to overlay component 106 (shown in FIG. 1 and described herein).

At operation 205, displaying of the overlay image on a display may be effectuated so that the virtual object appear augment the appearance of the handle. In some implementations, operation 205 may be performed by a processor component the same as or similar to display component 108 (shown in FIG. 1 and described herein).

At operation 206, changes in the position and/or the orientation for the virtual object may be determined. In some implementations, operation 206 may be performed by a processor component the same as or similar to position and orientation component 102 (shown in FIG. 1 and described herein).

At operation 207, the procedural audio may be determined based on the changes in the changes in the position and/or the orientation for the virtual object. The procedural audio may include a first modulation of the first sound, a second modulation of the second sound, and/or other sounds. In some implementations, operation 207 may be performed by a processor component the same as or similar to procedural audio component 110 (shown in FIG. 1 and described herein).

At operation 208, operation of a speaker may be effected to provide the procedural audio. The procedural audio may simulate the sounds of the virtual object. In some implementations, operation 207 may be performed by a processor component the same as or similar to speaker component 112 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating sounds of a virtual object, the system comprising:
    a storage medium storing a repository of sounds, the repository of sounds including a first sound and a second sound;
    a handle;
    a sensor carried by the handle, the sensor configured to generate motion and/or orientation output signals conveying motion and/or orientation information of the handle, the motion and/or orientation information of the handle specifying one or more of a yaw of the handle, a pitch of the handle, and/or a roll of the handle;
    a speaker;
    a display configured to display an overlay image, the overlay image depicting the virtual object, the overlay image being displayed such that the virtual object has a visual appearance of being attached to the handle during changes in the yaw of the handle, the pitch of the handle, and/or the roll of the handle; and
    one or more physical processors configured by machine readable instructions to:
        determine a position and/or an orientation for the virtual object based on the motion and/or orientation output signals, wherein the position and/or the orientation for the virtual object includes a yaw of the virtual object, a pitch of the virtual object, and/or a roll of the virtual object;

determine changes in the position and/or the orientation for the virtual object based on the motion and/or orientation output signals, wherein the changes in the position and/or the orientation for the virtual object include one or more of a change in the yaw of the virtual object, a change in the pitch of the virtual object, and/or a change in the roll of the virtual object;

determine audio output to simulate the sounds of the virtual object based on the changes in the position and/or the orientation for the virtual object, wherein the audio output to simulate the sounds of the virtual object includes a first modulation of the first sound and/or a second modulation of the second sound; and effectuate operation of the speaker to provide the audio output to simulate the sounds of the virtual object.

2. The system of claim 1, wherein the first sound includes a base tone and the second sound includes an overtone.

3. The system of claim 1, wherein the first modulation and/or the second modulation include changes in one or more of a pitch, an amplitude, and/or a timbre.

4. The system of claim 1, wherein the first modulation and the second modulation include different changes in one or more of a pitch, an amplitude, and/or a timbre.

5. The system of claim 1, wherein the first modulation and/or the second modulation includes a low-frequency oscillation multiplier.

6. The system of claim 1, wherein the changes in the position and/or the orientation for the virtual object include changes in the position and/or the orientation of a tip of the virtual object.

7. The system of claim 1, wherein determining the changes in the position and/or the orientation for the virtual object includes:
  determining a speed of the virtual object; and
  using a two-stage low-pass filter to determine a smoothed speed of the virtual object.

8. The system of claim 1, wherein the one or more physical processors are further configured to select the virtual object, wherein the audio output is determined further based on the selected virtual object.

9. The system of claim 1, further comprising:
  an image sensor configured to generate visual output signals conveying visual information within a field of view of the image sensor;
  wherein the one or more physical processors are further configured by machine readable instructions to:
    determine the position and/or the orientation for the virtual object further based on the visual output signals;
    determine the overlay image depicting the virtual object, wherein the virtual object is depicted within the overlay image according to the position and/or the orientation for the virtual object; and
    effectuate displaying of the overlay image on the display so that the virtual object appears to augment an appearance of the handle.

10. A method for simulating sounds of a virtual object, the method comprising:
  generating motion and/or orientation output signals conveying motion and/or orientation information of a handle, the motion and/or orientation information of the handle specifying one or more of a yaw of the handle, a pitch of the handle, and/or a roll of the handle;
  displaying an overlay image, the overlay image depicting the virtual object, the overlay image being displayed such that the virtual object has a visual appearance of being attached to the handle during changes in the yaw of the handle, the pitch of the handle, and/or the roll of the handle;
  determining a position and/or an orientation for the virtual object based on the motion and/or orientation output signals, wherein the position and/or the orientation for the virtual object includes a yaw of the virtual object, a pitch of the virtual object, and/or a roll of the virtual object;
  determining changes in the position and/or the orientation for the virtual object based on the motion and/or orientation output signals, wherein the changes in the position and/or the orientation for the virtual object include one or more of a change in the yaw of the virtual object, the pitch of the virtual object, and/or a change in the roll of the virtual object;
  determining audio output to simulate the sounds of the virtual object based on the changes in the position and/or the orientation for the virtual object, wherein the audio output includes a first modulation of a first sound and/or a second modulation of a second sound; and
  effectuating operation of a speaker to provide the audio output to simulate the sounds of the virtual object.

11. The method of claim 10, wherein the first sound includes a base tone and the second sound includes an overtone.

12. The method of claim 10, wherein the first modulation and/or the second modulation include changes in one or more of a pitch, an amplitude, and/or a timbre.

13. The method of claim 10, wherein the first modulation and the second modulation include different changes in one or more of a pitch, an amplitude, and/or a timbre.

14. The method of claim 10, wherein the first modulation and/or the second modulation includes a low-frequency oscillation multiplier.

15. The method of claim 10, wherein the changes in the position and/or the orientation for the virtual object include changes in the position and/or the orientation of a tip of the virtual object.

16. The method of claim 10, wherein determining the changes in the position and/or the orientation for the virtual object includes:
  determining a speed of the virtual object; and
  using a two-stage low-pass filter to determine a smoothed speed of the virtual object.

17. The method of claim 10, further comprising selecting the virtual object, wherein the audio output is determined further based on the selected virtual object.

18. The method of claim 10, further comprising:
  generating visual output signals conveying visual information within a field of view of an image sensor;
  determining the position and/or the orientation for the virtual object further based on the visual output signals;
  determining the overlay image depicting the virtual object, wherein the virtual object is within the overlay image according to the position and/or the orientation for the virtual object; and
  effectuating displaying of the overlay image on the display so that the virtual object appears to augment an appearance of the handle.

19. A system for simulating sounds of a virtual object, the system comprising:
  a storage medium storing a repository of sounds, the repository of sounds including a first sound and a second sound;

an image sensor configured to generate visual output signals conveying visual information within a field of view of the image sensor;

a handle;

a display configured to display an overlay image, the overlay image depicting the virtual object, the overlay image being displayed such that the virtual object has a visual appearance of being attached to the handle during changes in the yaw of the handle, the pitch of the handle, and/or the roll of the handle;

a sensor carried by the handle, the sensor configured to generate motion and/or orientation output signals conveying motion and/or orientation information of the handle, the motion and/or orientation information of the handle specifying one or more of a yaw of the handle, a pitch of the handle, and/or a roll of the handle;

a speaker; and one or more physical processors configured by machine readable instructions to:
  select the virtual object;
  change the virtual object;
  determine a position and/or an orientation for the virtual object based on the visual output signals and/or the motion and/or orientation output signals, wherein the position and/or the orientation for the virtual object includes a yaw of the virtual object, a pitch of the virtual object, and/or a roll of the virtual object;
  determine the overlay image comprising the virtual object, wherein the virtual object is placed within the overlay image according to the position and/or the orientation for the virtual object;
  effectuate displaying of the overlay image on the display so that the virtual object appears to augment an appearance of the handle;
  determine changes in the position and/or the orientation for the virtual object based on the motion and/or orientation output signals, wherein the changes in the position and/or the orientation for the virtual object include one or more of a change in the yaw of the virtual object, a change in the pitch of the virtual object, and/or a change in the roll of the virtual object;
  determine audio output to simulate the sounds of the virtual object based on the selected virtual object or the changed virtual object, and further based on the changes in the position and/or the orientation for the virtual object, wherein the audio output includes a first modulation of the first sound and/or a second modulation of the second sound; and
  effectuate operation of the speaker to provide the audio output to simulate the sounds of the virtual object.

20. The system of claim 19, wherein:
the first sound includes a base tone and the second sound includes an overtone; and
the first modulation and/or the second modulation include changes in one or more of a pitch, an amplitude, and/or a timbre.

* * * * *